United States Patent [19]

Wentzel

[11] Patent Number: 5,408,047

[45] Date of Patent: * Apr. 18, 1995

[54] TRANSITION JOINT FOR OIL-FILLED CABLES

[75] Inventor: Carl J. Wentzel, Austin, Tex.

[73] Assignee: Minnesota Mining and Manufacturing Company, St. Paul, Minn.

[*] Notice: The portion of the term of this patent subsequent to Dec. 20, 2011 has been disclaimed.

[21] Appl. No.: 68,800

[22] Filed: Jun. 1, 1993

Related U.S. Application Data

[63] Continuation-in-part of Ser. No. 925,448, Aug. 10, 1992, abandoned, which is a continuation of Ser. No. 603,944, Oct. 25, 1990, abandoned.

[51] Int. Cl.[6] .................. H02G 15/08; H02G 1/14
[52] U.S. Cl. ............................ 174/73.1; 174/75 R; 174/84 R; 174/85; 174/DIG. 8; 156/49
[58] Field of Search ............... 174/73.1, 71 R, 74 R, 174/75 R, 84 R, 88 C, 19, 85, DIG. 8; 159/49

[56] References Cited

U.S. PATENT DOCUMENTS

| | | | |
|---|---|---|---|
| 3,127,291 | 3/1964 | Betz et al. | 174/75 R |
| 3,816,640 | 6/1974 | Varner | 174/73.1 |
| 4,375,577 | 3/1983 | Silver et al. | 174/73.1 |
| 4,383,131 | 5/1983 | Clabburn | 174/73.1 |
| 4,458,103 | 7/1984 | Irie et al. | 174/73.1 |

OTHER PUBLICATIONS

Insulation Systems, Inc. "No heat shrink tubing & tape" 1976, pp. 1–4 and 6.

Primary Examiner—Leo P. Picard
Assistant Examiner—Hyung S. Sough
Attorney, Agent, or Firm—Gary L. Griswold; Walter N. Kirn; Jack V. Musgrove

[57] ABSTRACT

A transition joint for sealing an electrical coaxial cable having an oil-impregnated or fluid filled layer. The transition joint has two primary elements, an electrically insulative elastomeric tube and a heat recoverable sleeve. In connecting a paper-insulated, lead jacketed cable to an extruded dielectric cable, the elastomeric tube is placed in tight conformity around the paper layer, slightly overlapping the lead jacket and the central conductor, and further partially overlapping a connector joining the conductors of the cables. The heat recoverable sleeve is then contracted over the elastomeric tube, overlapping the lead jacket and the central conductor, and partially overlapping the connector. The heat recoverable sleeve mechanically restricts the elastomeric tube, preventing the elastomeric tube from swelling which, in turn, precludes absorption of the oil, which would otherwise cause the elastomer to degrade. A flexible tape may be substituted for the heat recoverable sleeve to provide the mechanical confining pressure. If the cable has an additional semiconducting layer, a high-dielectric tape may be used for dielectric stress control.

14 Claims, 3 Drawing Sheets

TRANSITION JOINT FOR OIL-FILLED CABLES

CROSS-REFERENCE TO RELATED APPLICATIONS

This application is a continuation-in-part of U.S. patent application Ser. No. 07/925,448 filed on Aug. 10, 1992, abandoned, which is a continuation of U.S. patent application Ser. No. 07/603,944, filed on Oct. 25, 1990, now abandoned.

BACKGROUND OF THE INVENTION

1. Field of the Invention

The present invention generally relates to coverings for splice connections in electrical cables, and more particularly to a transition joint for use when splicing or terminating a cable having an oil-impregnated layer.

2. Description of the Prior Art

Electrical cables, such as those used for telephone lines, high voltage lines, cable television, etc., can develop faults or breaks in the line due to manufacturing defects or environmental factors. Faults occur both in underground and aerial cables. Rather than replacing an entire section of such a cable, it is expedient to expose a portion of cable, repair the fault, and place an enclosure about the connection. Splicing of electrical wires is similarly useful in the connection of successive cable sections, and in the termination of such cables.

One of the earliest constructions for these cables, particularly for underground telephone and power cables, consists of a lead jacket surrounding one or more conductors, with a layer of insulative, oil-impregnated paper placed between the lead jacket and the conductors. Although modern underground cables now have extruded dielectric (plastic) jackets, with no fluid inside, there are still substantial amounts of the paper-insulated lead cables ("PILC") in use. A problem thus arises when a PILC cable needs to be repaired or terminated, due to the deleterious effects caused by the egress of the oil or other dielectric fluid.

Several prior art patents are directed to splicing of PILC cables, including U.S. Pat. Nos. 4,110,550 issued to Di Pietro; 4,354,050 issued to Gregory; 4,375,577 issued to Silver et al.; 4,383,131 issued to Clabburn; 4,638,112 issued to Giorgio et al.; and 4,695,676 issued to Lawrence et al. Each of these patents, however, suffer from certain drawbacks. For example, in the transition splice disclosed in Clabburn (see FIG. 4), four separate layers of polymeric materials are used in addition to an internal void filling material and an outer metallic braid. Clearly, this construction is unduly complicated and requires an excessive amount of time to assemble. Those skilled in the art will further appreciate that the Clabburn construction, while disclosing the use of elastomeric tubing, requires that an oil-impervious layer be interposed between any such elastomeric tubing and the oil-impregnated paper. Such an oil-impervious layer has been required in prior art splice assemblies due to the fact that, if the oil comes into direct contact with the elastomeric layer, the oil will be absorbed into the elastomer, causing it to swell and eventually degrade; this promotes the creation of voids at the interface between the elastomer and the cable, leading to high-voltage failures. Finally, Clabburn relies on a heat shrinkable material which is in contact with the cable; this construction is undesirable since, as the material is heated, oil within the cable can easily vaporize and leave a harmful void between the cable surface and the oil-impervious (heat shrinkable) layer.

The Di Pietro, Gregory, Silver et al. and Giorgio et al. assemblies each require several metallic parts, such as bars, ferrules, collars, clamps and the like, which are also difficult to apply and are more expensive than the materials used in Clabburn. The construction of Lawrence et al. is somewhat simpler, but still requires placement of a mass of encapsulating particulate material. Furthermore, the splice shown in Lawrence et al. (as well as that shown in Clabburn) is not suitable for termination joints, i.e., a joint which effectively seals the end of the fluid-filled cable and allows a wide variety of cable accessories to then be attached thereto. It would, therefore, be desirable and advantageous to devise a transition joint for a fluid-filled cable which is simpler (and less expensive) to assemble than the foregoing splice assemblies, and which has wider application for connecting two of such cables together, for splicing one such cable to a plastic dielectric cable, for terminating the fluid-filled cable, or for receiving various other cable accessories.

SUMMARY OF THE INVENTION

The foregoing objective is achieved in a transition joint assembly kit comprising an elastomeric, pre-stretched tube adapted to be placed around the exposed end of the PILC cable, directly in contact with the oil-impregnated paper, and a heat recoverable tubular sleeve which is adapted to completely surround and confine the elastomeric tube. The heat recoverable sleeve mechanically restricts the elastomeric tube, preventing the elastomeric tube from swelling which, in turn, precludes absorption of the degradative oil. A complete oil seal is thus achieved with only two layers in the joint, and without the need for oil-resistant mastics, epoxy sealing resins, or metal clamps. The heat recoverable sleeve may be replaced by a layer of tightly wound tape in order to provide the mechanical confinement necessary to prevent the elastomeric tube from absorbing the oil.

This construction offers greater simplicity in design and application, affording both cost and time savings. The novel transition joint assembly essentially converts the end of the PILC cable into a plastic (extruded dielectric) cable, which can then be connected to another cable (PILC or extruded dielectric), or fitted with a termination. Pre-molded or extruded cable accessories, which are designed for use with extruded dielectric cables and normally not usable with PILC cables, may be used to effect these connections.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
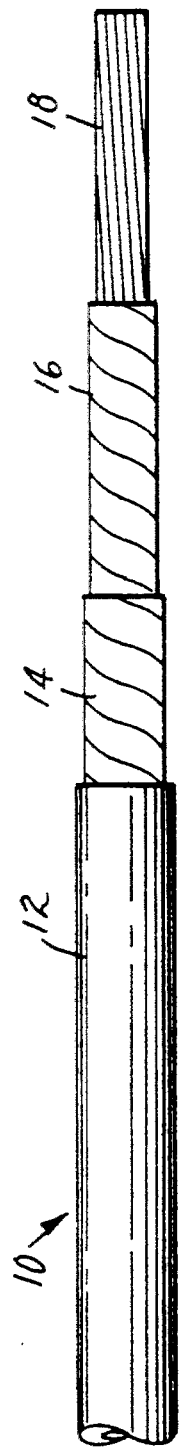
FIG. 1 is a side elevational view of the terminal end of a paper-insulated, lead-jacketed, coaxial cable, with portions of the various layers removed, exposing the central conductor.

With reference now to the figures, and in particular with reference to FIG. 1, there is depicted an exemplary coaxial cable 10 which contains a dielectric fluid therein. Such a cable is typically constructed of an outer lead jacket 12, an intermediate semiconducting layer 14 formed of carbon-loaded paper, an insulative layer 16 formed of oil-impregnated paper, and a central conductor or group of conductors 18. The present invention is primarily designed for making a transition from such an oil-filled cable. It should also be understood, however, that the invention will work with cables having other fluids therein, including those filled with a dielectric jelly. Some PILC cables also have a plastic sheath which surrounds the lead jacket.

As shown in FIG. 1, the PILC cable is prepared for splicing by first cutting off a large section (e.g., 28 cm) of lead jacket 12, thereby exposing semiconducting layer 14. Sharp corners at the edge of lead jacket 12 should be peened. A slightly smaller section (e.g., 22 cm) of semiconducting layer 14 is similarly removed, exposing insulative layer 16. Finally, an even smaller section (e.g., 11 cm) of insulative layer 16 is removed, exposing central conductor 18.

Figure 2:
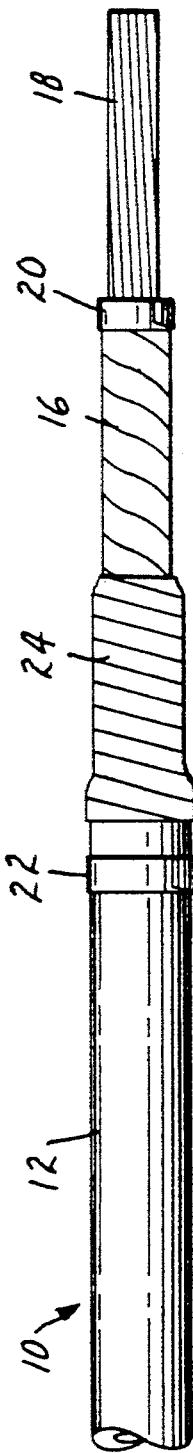
FIG. 2 is an elevational view similar to FIG. 1 wherein electrical stress-relief tape has been applied to the end of the lead jacket and the intermediate semiconducting layer, and the paper insulation has been taped to prevent unravelling, in accordance with the present invention.

As shown in FIG. 2, insulative layer 16 may be held in place by a strip of (insulative) adhesive tape 20, which keeps the paper insulation from unravelling. Tape 20 should be applied with the adhesive side out to allow tensioning on the second wrap thereof. An appropriate tape for this purpose is sold by Minnesota Mining & Manufacturing Co. (3M), assignee of the present invention, under product number 33+ vinyl electrical tape. A second strip of tape 22 may be placed on lead jacket 12 near its edge (e.g., 1–2 cm); tape 22 is used to mark the location of the edge of lead jacket 12 as explained below. The same type of tape may be used for tape 22 as was used for tape 20.

As further preparation for the installation of the transition joint of the present invention, cable 10 should preferably be provided with some form of dielectric stress relief. This may easily be accomplished by winding a high-dielectric constant tape 24 around the terminal portion of lead jacket 12 and semiconducting layer 14. Stress control tape 24 should completely cover semiconducting layer 14 and slightly overlap (e.g., 1 cm) insulative layer 16; it is preferably wrapped in two half-lapped layers. An appropriate tape for this purpose is available from 3M under product number 2220 stress control tape.

Figure 3:
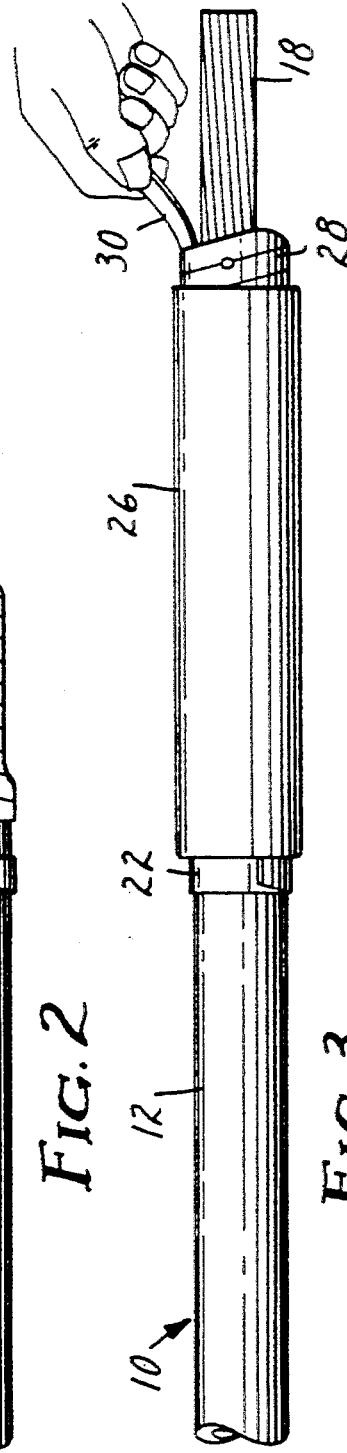
FIG. 3 is another elevational view similar to the previous figures, but further illustrating application of the elastomeric tube which forms part of a transition joint constructed in accordance with the kit and method of the present invention.

With reference now to FIG. 3, the first element of the transition joint kit and method of the present invention is an elastomeric tube 26. Elastomeric tube 26 is typically fabricated by extrusion and, in its relaxed state, is generally cylindrical. It may be formed of any elastomeric material, such as natural rubber, synthetic (silicone) rubber, styrene-butadiene rubber, polychloroprene, or urethane rubber (this list is not exhaustive). The preferred material for elastomeric tube 26 is ethylene-propylene non-conjugated diene terpolymer (EPDM), which is electrically insulative. It is understood that the terms "tube" and "tubular" are not limited to objects having a circular cross-section, but rather denotes a hollow, elongated member of any cross-section.

The size of elastomeric tube 26 may vary considerably, depending upon the size of the cable to be spliced. The length of elastomeric tube 26 should be greater than the combined length of the exposed portions of semiconducting layer 14 and insulative layer 16; based on the exemplary dimensions previously given, elastomeric tube 26 should be about 20 cm long. The diameter of elastomeric tube 26 (in its relaxed state), should be smaller than the diameter of central conductor 18, typically in the range of one to five centimeters. Due to the elastic properties of elastomeric tube 26, a single diameter tube may conveniently be used on cables of varying diameter. Of course, in the expanded state shown in FIG. 3, the diameter of elastomeric tube 26 is greater than the diameter of cable 10. The thickness of elastomeric tube 26 (in its relaxed state) may vary.

Although elastomeric tube 26 may be applied without prior expansion, e.g., by sliding it over cable 10 with the use of a lubricant, or by everting the tube and rolling it onto cable 10, it is greatly preferable to pre-load elastomeric tube 26 onto a removable core 28, as described in U.S. Pat. No. 3,515,798 issued to Sievert. Removable core 28 maintains elastomeric tube 26 in a radially expanded state, and is also generally cylindrical and slightly longer than elastomeric tube 26. The diameter of removable core 28 may vary widely, the only practical requirement being that it is larger than the outer diameter of cable 10, and providing sufficient clearance for the core to be unwound. Removable core 28 is constructed of any durable, flexible material, such as cellulose acetate butyrate, polypropylene, polyethylene or polyvinyl chloride, and has a helical groove formed by a continuous strip, adjacent coils being interconnected. A similar core may be fabricated by helically perforating a hollow cylinder. The wall of core 28 typically has a thickness in the range of one millimeter to five millimeters. Core 28 is collapsed by firmly pulling and unwinding the end 30 of the strip.

Figure 4:
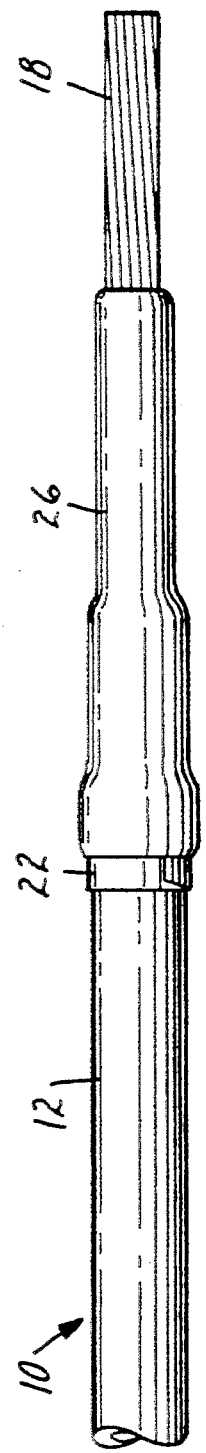
FIG. 4 is yet another elevational view further depicting the elastomeric tube in tight conformity with the PILC cable.
Figure 5A:
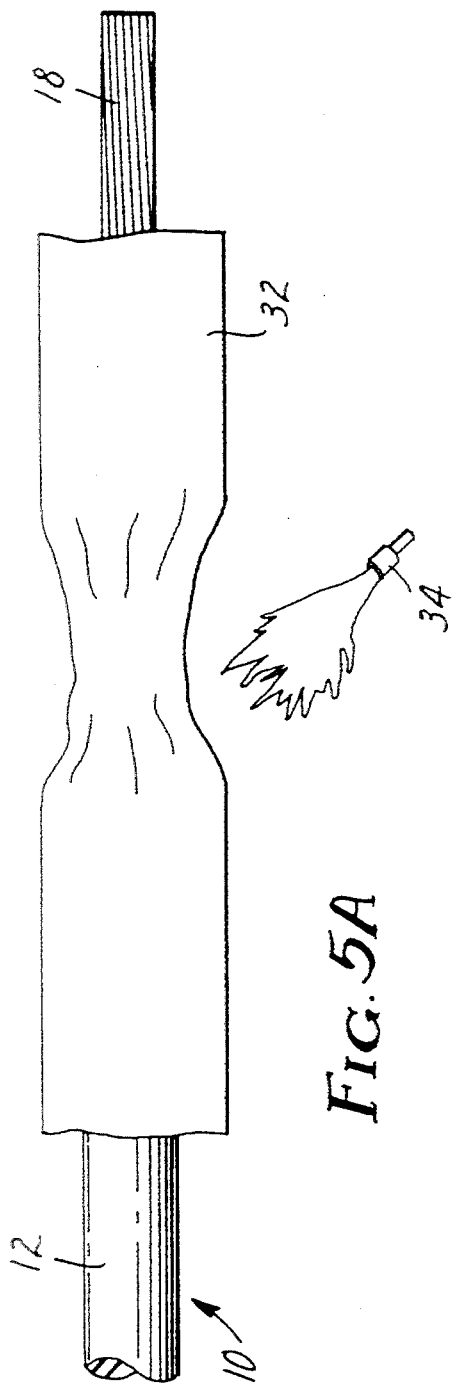
FIG. 5A is still another elevational view showing application of the heat recoverable sleeve which forms a part of the transition joint of the present invention.

As shown in FIG. 3, one end of elastomeric tube 26 is held adjacent marking tape 22. As end 30 of removable core 28 is pulled, elastomeric tube 26 slowly shrinks in place around cable 10, until it is in tight conformity with cable 10 as shown in FIG. 4. It should be noted that elastomeric tube 26 is in direct contact with insulative layer 16 (oil-impregnated paper). The second element of the transition joint of the present invention may now be installed, namely, the heat recoverable sleeve 32 illustrated in FIG. 5A.

Heat recoverable sleeve 32 is placed over cable 10, completely covering elastomeric tube 26 (marker tape 22 is preferably removed before installation of sleeve 32). A heat source is then applied, such as from a torch 34, causing heat recoverable sleeve 32 to shrink in close conformity about elastomeric tube 26. The heat source should be applied evenly, starting at the center of heat recoverable sleeve 32. Sleeve 32 should be heated until wrinkle free and in constricting contact with lead jacket 12 at one end, and with central conductor 18 at the other end. Those skilled in the art will appreciate that elastomeric tube 26 acts as a thermal barrier such that, as heat is applied to sleeve 32, the oil within cable 10 is not overly heated, and thus does not vaporize and cause the harmful voids which are often created in prior art transition splices.

Heat recoverable sleeve 32 may also be formed from a wide variety of materials, particularly polymeric resins such as polytetrafluoroethylene, polychloroprene, fluoroelastomers or cross-linked polyolefins (this list is not exhaustive). The preferred material is polyvinylidene fluoride, which meets the primary requisites of being heat recoverable and electrically insulative, and having a crystalline melting point higher than that generated in emergency overload conditions of cable 10. Such material is sold by 3M under the brand name Kynar. Other heat recoverable materials may be used if their melting point is greater than 125° C., and preferably about 175° C. The term "heat recoverable" as used herein refers to any thermoelastic material, i.e., any material which, upon the application of heat, either returns to its original (smaller) shape, or shrinks without having been previously deformed.

As with elastomeric tube 26, the size of heat recoverable sleeve 32 may vary considerably, depending upon the size of the cable to be spliced. The length of sleeve 32, in its contracted state, should be greater than the length of elastomeric tube 26, and preferably overlaps lead jacket 12 by about two cm and overlaps central conductor 18 by about one cm. The length of sleeve 32 in its contracted state may easily be determined since most of the above-listed thermoelastic materials have fairly exact shrinkage ratios. Excess sleeve length may be trimmed after shrinkage; this is best accomplished while sleeve 32 is still warm to the touch. Of course, the diameter of sleeve 32 in its expanded state must be large enough to accommodate cable 10; the diameter in its contracted state should be smaller than the diameter of central conductor 18.

Once heat recoverable sleeve 32 is in place, the transition joint of the present invention is complete. This assembly creates a reliable seal and prevents the egress of any oil exuding from insulative layer 16, in spite of the fact that the oil-permeable elastomeric tube 26 is in intimate contact with the oil-impregnated paper (contrary to conventional wisdom). It has been found that the mechanical confining pressure around elastomeric tube 26, imparted by heat recoverable sleeve 32, prevents the absorption of oil into the elastomeric material. In other words, this confining pressure is greater than the osmotic pressure at the oil/elastomer interface. Testing has shown that, with this construction, elastomeric tube 26 does not absorb any significant amount of oil, and no degradation takes place. In fact, the transition joint of the present invention successfully passed several thermal cycling and elevated pressure tests, the most severe of these being at 110° C. and 25 PSI ($\approx 1.7 \times 10^5$ Pa); this exceeded industry test requirements.

Figure 6:
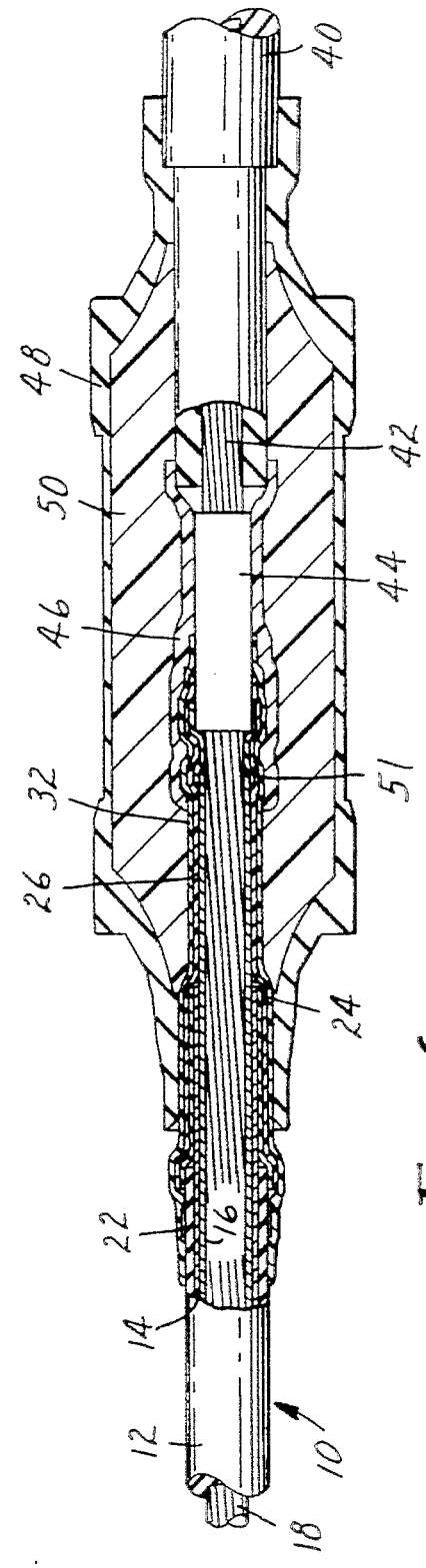
FIG. 6 is a longitudinal cross-section showing the transition joint on a PILC cable, and further illustrating a connection of the PILC cable to a second cable.
Figure 5B:
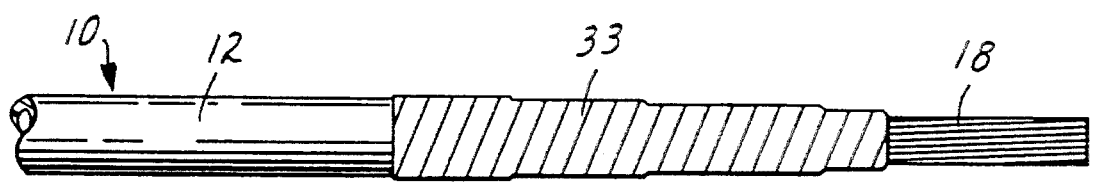
FIG. 5B is an elevational view similar to FIG. 5A but depicting a tape layer in lieu of the heat recoverable sleeve.

Referring now to FIG. 5B, those skilled in the art will appreciate that means may be provided, other than heat recoverable sleeve 32, to provide the mechanical confinement pressure about elastomeric tube 26 necessary to prevent swelling of the tube caused by absorption of the oil. Specifically, another layer of tape 33 may be applied over tube 26. Suitable tapes include the #1 and #20 tapes sold by 3M. These tapes are epoxy-impregnated, nonwoven polyester with acrylic adhesive. Two half-lapped layers of tapes 33 are preferably formed about tube 26, applying one layer along one direction of cable 10, and then applying the second layer in the reverse direction. The aforementioned tapes are preferable since they are flexible and highly stretchable (e.g., to 80% of the original width), which helps orient the tape properly and also imparts additional strength to the splice. The finished splice is also more flexible when tape 33 is used in lieu of sleeve 32, since sleeve 32 is fairly rigid when recovered about tube 26. This flexibility of the finished splice facilitates installation in crowded environments, such as in a man hole, and also provides a more resilient splice for aerial applications. In this regard, the aforementioned tapes may be The transition joint of the present invention effectively converts the terminal end of a PILC cable into a plastic cable. The converted cable may then accommodate the use of various cable accessories which are normally limited to extruded dielectric cables. For example, a connector may be used to attach a termination lug to central conductor 18 or, as shown in FIG. 6, a separate splice assembly may be used to connect cable 10 to another cable 40. Cable 40 may be an extruded dielectric cable, or a PILC cable which also has a transition joint.

In FIG. 6, central conductor 18 of cable 10 is connected to the central conductor 42 of cable 40 by a connector 44, preferably a crimp-type connector. This connection is formed prior to application of elastomeric tube 26 and heat recoverable sleeve 32 (or tape 33). Of course, both of those elements must be threaded onto cable 10 prior to attachment of connector 44, but they are maintained in their expanded states until after the connection is complete. In the connection shown in FIG. 6, tube 26 and sleeve 32 preferably overlap connector 44. It is also desirable to utilize another splicing tape layer 51 under tube 26, between the terminal end of paper layer 16 and connector 44; this prevents tube 26 from swelling inwardly, and thus further precludes the absorption of oil by elastomeric tube 26. Connector 44 may then be covered by a closure 46 (e.g., another elastomeric or heat recoverable tube), and the entire connection surrounded by a larger splice housing 48. Splice housing 48 provides protection against environmental influences, particularly moisture penetration, and provides electrical shielding and continuity. Splice housing may be provided with an insulating material 50. For additional environmental protection, two elastomeric tubes (not shown) may be placed over cable 10 overlapping the ends of housing 48. The splice housing illustrated is 3M's QS-II ™ 5451A medium voltage molded rubber splice; in this splice, closure 46, insulating material 50 and housing 48 are all formed integrally at the factory, and closure 46 and housing 48 are electrically conductive.

Figure 7:
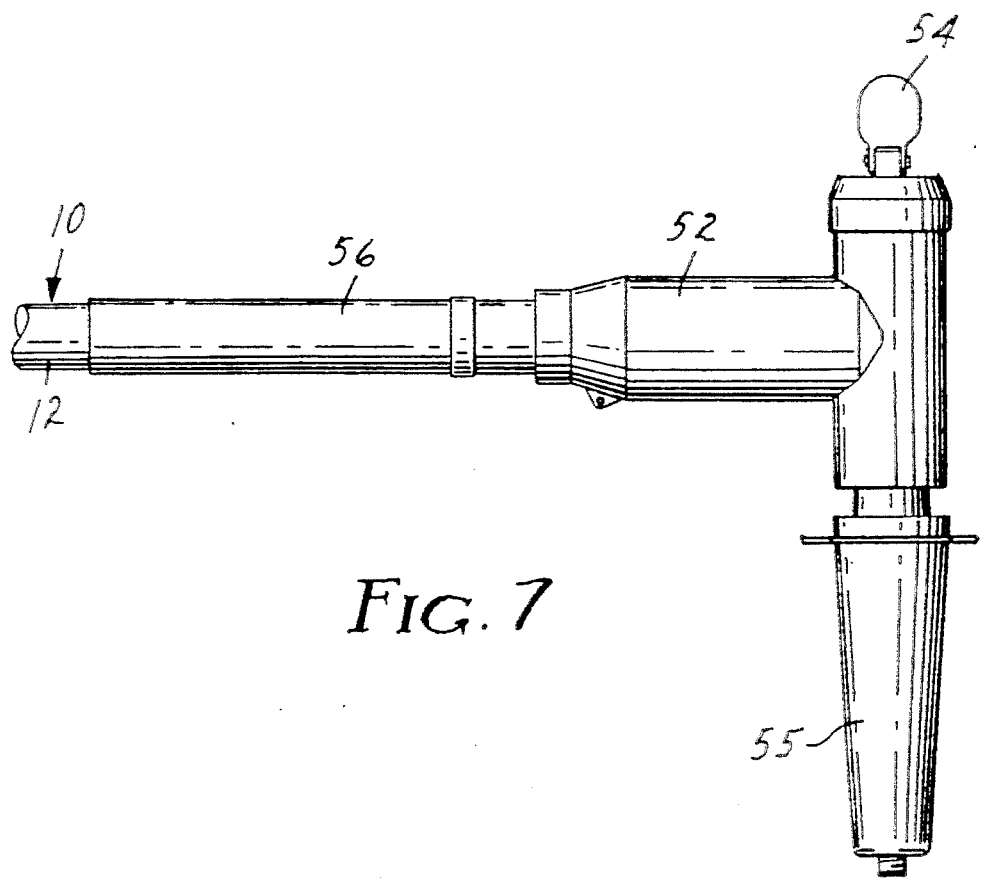
FIG. 7 is a top plan view of the transition joint of the present invention depicting a connection of the PILC cable to a "Tee" module.

FIG. 7 depicts a connection of the converted PILC cable 10 to a "Tee" module 52. Tee module 52 has an internal connector which is attached to the central conductor 18 of cable 10. The free ends of Tee module 52 may be provided with other connectors. In FIG. 7, one end is shown covered with a removable cap 54 while the other end is provided with a connecting plug 55 which may be further connected to other cables. The tee module illustrated is 3M's 600A deadfront elbow cable termination. Another elastomeric tube 56 surrounds the main opening of tee module 52 to provide further integrity against environmental influences.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the geometry of the cable accessories might require use of an additional elastomeric member surrounding central conductor 18 at a gap between a termination lug and the end of the first heat recoverable sleeve 32; this would also require use of an additional heat recoverable sleeve around the second elastomeric member. It is therefore contemplated that the appended claims will cover such modifications that fall within the true scope of the invention.

I claim:

1. A transition joint at the terminal end of a coaxial cable having a partially exposed central conductor, a partially exposed, oil-impregnated, electrically insulative paper layer surrounding the conductor, a partially exposed semiconducting layer surrounding the paper layer, and a lead jacket surrounding the semiconducting layer, the transition joint comprising:
   a high-dielectric constant tape wrapped around the terminal end of the lead jacket and the exposed portion of the semiconducting layer;
   an electrically insulative, oil-permeable, elastomeric tube having a length which is greater than the combined lengths of the exposed portions of the semiconducting and paper layers, said elastomeric tube contacting and surrounding said dielectric tape and the exposed portion of the paper layer, and said elastomeric tube being constructed of a material which degrades upon substantial absorption of oil from said oil-impregnated paper layer; and
   a layer of electrically insulative tape contacting, surrounding and confining said elastomeric tube, and restricting absorption of said oil by said elastomeric tube.

2. The transition joint of claim 1 wherein said elastomeric tube is composed of ethylene-propylene non-conjugated diene terpolymer.

3. The transition joint of claim 1 wherein said insulative tape is flexible.

4. The transition joint of claim 1 wherein said insulative tape is a nonwoven polyester.

5. The transition joint of claim 1 wherein said insulative tape further surrounds a portion of the lead jacket and a portion of the central conductor.

6. The transition joint of claim 1 further comprising means for connecting the central conductor to a termination lug.

7. The transition joint of claim 1 further comprising means for connecting the central conductor to the conductor of a second coaxial cable.

8. A method of converting the terminal end of a coaxial cable having a central conductor, a layer of oil-impregnated paper surrounding the conductor, and an electrically conductive jacket surrounding the paper layer, comprising the steps of:
   removing a portion of the jacket, thereby partially exposing the paper layer;
   cutting away a portion of the paper layer, thereby partially exposing the central conductor;
   placing an electrically insulative, oil-permeable, elastomeric tube in tight conformity around the entire exposed portion of the paper layer and in direct contact with said paper layer, said elastomeric tube being constructed of a material which degrades upon substantial absorption of oil from said oil-impregated paper layer; and
   applying an electrically insulative tape layer around the elastomeric tube whereby the insulative tape layer imparts sufficient confinement pressure about the elastomeric tube to prevent any significant absorption of oil by the elastomeric tube, the insulative tape layer being sufficiently long to overlap the conductive jacket at one end and overlap the central conductor at the other end.

9. The method of claim 8 wherein the coaxial cable further has a semiconducting layer between the conductive jacket and the paper layer, said removing step partially exposing the semiconducting layer, comprising the additional steps of:
   trimming a portion of the semiconducting layer, prior to said step of cutting away the portion of the paper layer; and
   wrapping a layer of dielectric stress control material around the terminal end of the conductive jacket and around the exposed portion of the semiconducting layer, prior to said step of placing the elastomeric tube around the paper layer.

10. The method of claim 8 further comprising the step of wrapping a marker tape around the lead jacket proximate its terminal end, and wherein said step of placing the elastomeric tube around the paper layer includes the step of aligning one end of the elastomeric tube with the marker tape.

11. The method of claim 8 further comprising the step of attaching a termination lug to the central conductor.

12. The method of claim 8 further comprising the step of attaching the conductor of a second cable to the central conductor of the coaxial cable by means of an electrical connector.

13. The method of claim 12 further comprising the step of applying a layer of splicing tape around the central conductor between the paper layer and the connector, and wherein the elastomeric tube and the insulative tape layer partially surround the connector, the splicing tape layer preventing inward swelling of the elastomeric tube.

14. The method of claim 12 further comprising the step of enclosing the connection between the two conductors with a splice housing.

* * * * *